(No Model.)

T. C. MERZ.
CAPSULE CUTTING MACHINE.

No. 535,595. Patented Mar. 12, 1895.

WITNESSES:
All Bundue
Horace A. Dodger.

INVENTOR
Theodore C. Merz
BY Dodger Sons,
ATTORNEYS.

UNITED STATES PATENT OFFICE.

THEODORE C. MERZ, OF DETROIT, MICHIGAN, ASSIGNOR TO THE MERZ CAPSULE COMPANY, OF SAME PLACE.

CAPSULE-CUTTING MACHINE.

SPECIFICATION forming part of Letters Patent No. 535,595, dated March 12, 1895.

Application filed December 29, 1893. Serial No. 495,121. (No model.)

*To all whom it may concern:*

Be it known that I, THEODORE C. MERZ, a citizen of the United States, residing at Detroit, in the county of Wayne and State of Michigan, have invented certain new and useful Improvements in Machinery for Cutting Capsules, of which the following is a specification.

My invention relates to the manufacture of capsules, and has reference more particularly to a novel means for cutting off the capsules.

Figure 1:
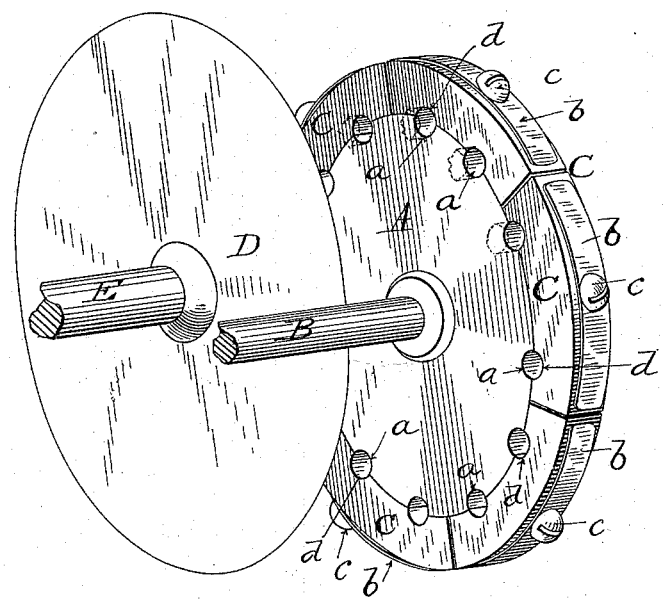
Figure 2:
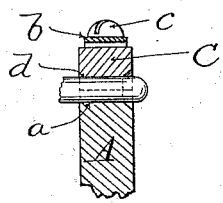

In the drawings,—Figure 1 is a perspective view of a simple form of machine for carrying out the invention; and Fig. 2, a vertical sectional view through the frame or capsule holder.

A indicates a frame or capsule-holder, which in the present instance is made in the form of a disk and adapted to turn or rotate either with or upon a shaft or spindle B. In the periphery of the disk is a series of transverse grooves or seats $a$, which are adapted to receive and assist in holding the capsules in place.

C C are blocks which are applied to the periphery of the disk, and held in place by means of springs $b$ (preferably flat) carried by the screws $c$ which pass through the blocks and into the body of the frame or disk. These blocks are provided with seats or grooves $d$ which register with those formed in the periphery of the disk, and in connection with the latter, form grooves to hold the capsules in place, as shown, with a yielding pressure determined by the screws and springs. These grooves are countersunk on their outer faces as in Fig. 2, to render certain and easy the insertion of the capsules,—a feature which is of considerable importance when the end of the capsule is irregular or uneven.

When it is desired to insert the capsules, the blocks C are raised or moved outward slightly,—away from the periphery of the disk,—by entering the open end of the capsule into the hole or opening formed by the semi-circular seats or grooves $a$ $d$, and then passing the capsule through far enough to allow one end,—the open end,—to project beyond the face of the disk.

Arranged in proximity to the frame or capsule-holder is a knife or cutter D, made preferably in the form of a disk and adapted to be rotated upon or with a shaft E. The cutting edge of the knife works close to or in contact with the flat side face of the frame A and projects inward toward the center of the frame far enough to act upon the capsules carried thereby.

Heretofore capsules have been put upon pins, and then cut, but such operation was slow, required much time, and was not altogether satisfactory. Under the present invention, by projecting the capsules to a greater or less extent, they may be cut at different but uniform lengths.

The form and construction of the mechanical devices herein shown and described may be varied considerably without departing from the spirit of the invention.

It will be noticed upon reference to the drawings that the frame in which the capsules are carried, in and of itself, and without the aid of extraneous devices (such as are employed in spool and cigar cutting machines) securely holds and clamps the capsules. This is attained by providing the frame or holder with holes, which are distinguishable from mere notches or open sockets, in that they,—the holes,—afford a firm support for and protect the capsules, and prevent their being crushed or broken down, as would be the case were the capsules held in place by other means.

Having thus described my invention, what I claim is—

1. In combination with a cutter; a capsule-holding frame provided with holes in which the capsules are held and clamped with their open ends projecting toward the cutter; whereby the capsules are encircled and supported on all sides by the frame, substantially as shown and described.

2. In combination with a rotatable disk or frame; yielding blocks applied to the periphery of the disk to clamp the capsules between said disk and blocks; and a cutter to act upon the projecting open ends of the capsules.

3. In combination with a rotatable disk provided with transverse grooves in its periphery; blocks applied to the periphery of the disk and having grooves in line with those in the disk; yielding devices for holding the blocks upon the capsules seated in the grooves;

and a cutter to act upon the projecting open ends of the capsules.

4. In combination with the cutter, a rotatable disk A provided on its periphery with transverse grooves $a$; blocks C also provided with grooves $d$; screws $c$ passing through the blocks and into the disk; and springs $b$ between the heads of the screws and the blocks, whereby the blocks are urged toward the disk with a yielding force.

5. In combination with a capsule-holding frame provided with countersunk seats for the capsules; a cutter to act upon the projecting open ends of the capsules.

In witness whereof I hereunto set my hand in the presence of two witnesses.

THEODORE C. MERZ.

Witnesses:
 SOL E. HEINEMAN,
 DAVID E. HEINEMAN.